Dec. 18, 1934.  A. HEILBRUNN  1,984,926
MANUFACTURE OF GALVANIC CELLS
Filed Aug. 12, 1932   7 Sheets-Sheet 1
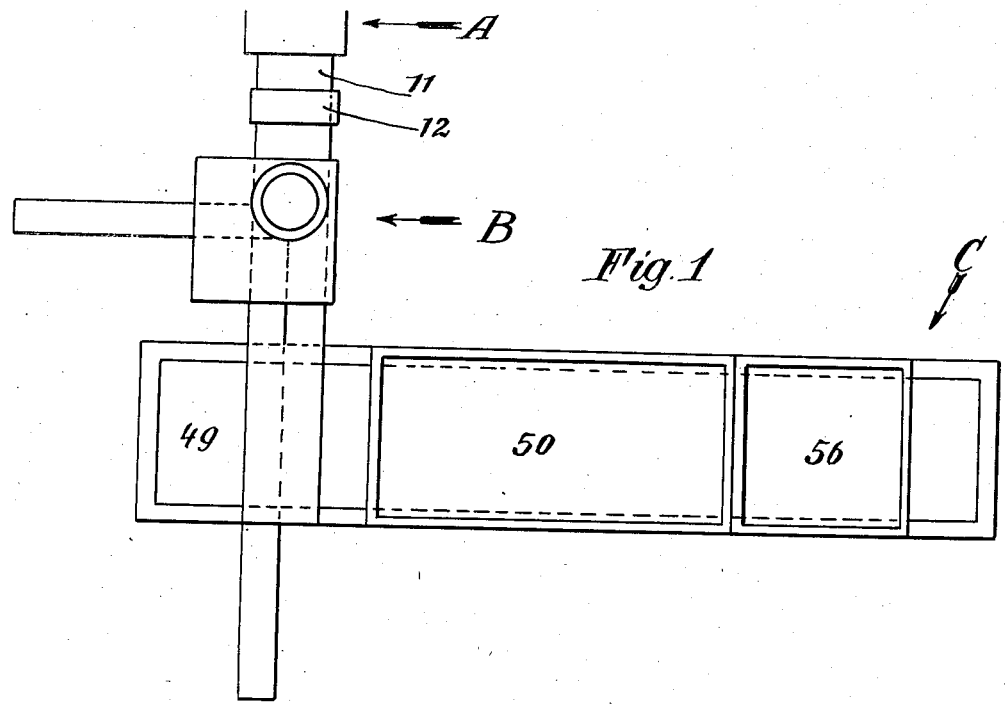
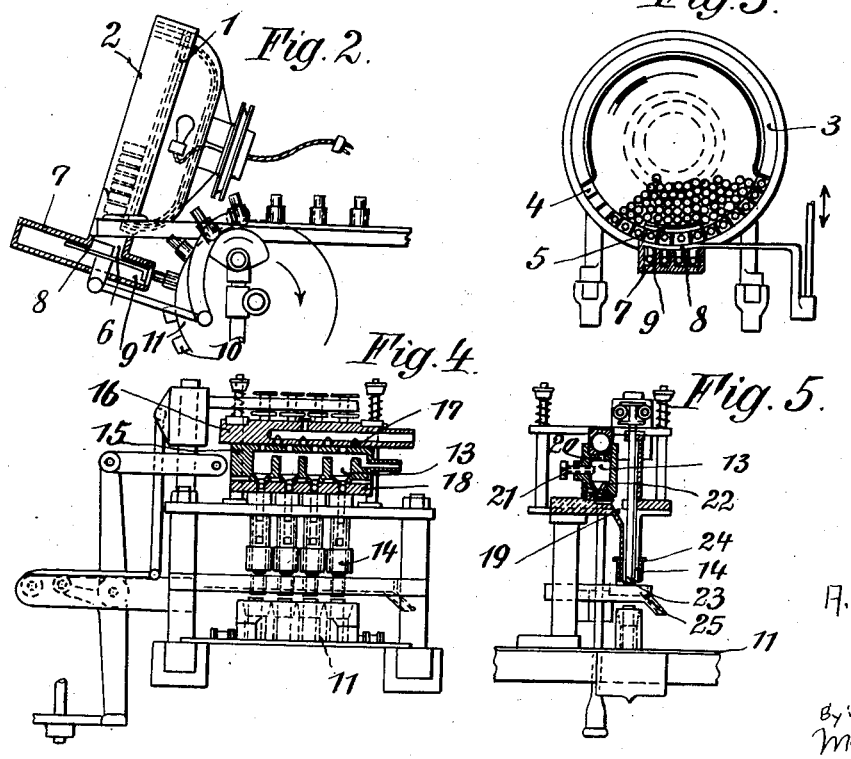
A. Heilbrunn
INVENTOR
By: Marks & Clerk
Attys.

Dec. 18, 1934.  A. HEILBRUNN  1,984,926
MANUFACTURE OF GALVANIC CELLS
Filed Aug. 12, 1932   7 Sheets-Sheet 2

A. Heilbrunn
INVENTOR

By: Marks Clerk
Attys.

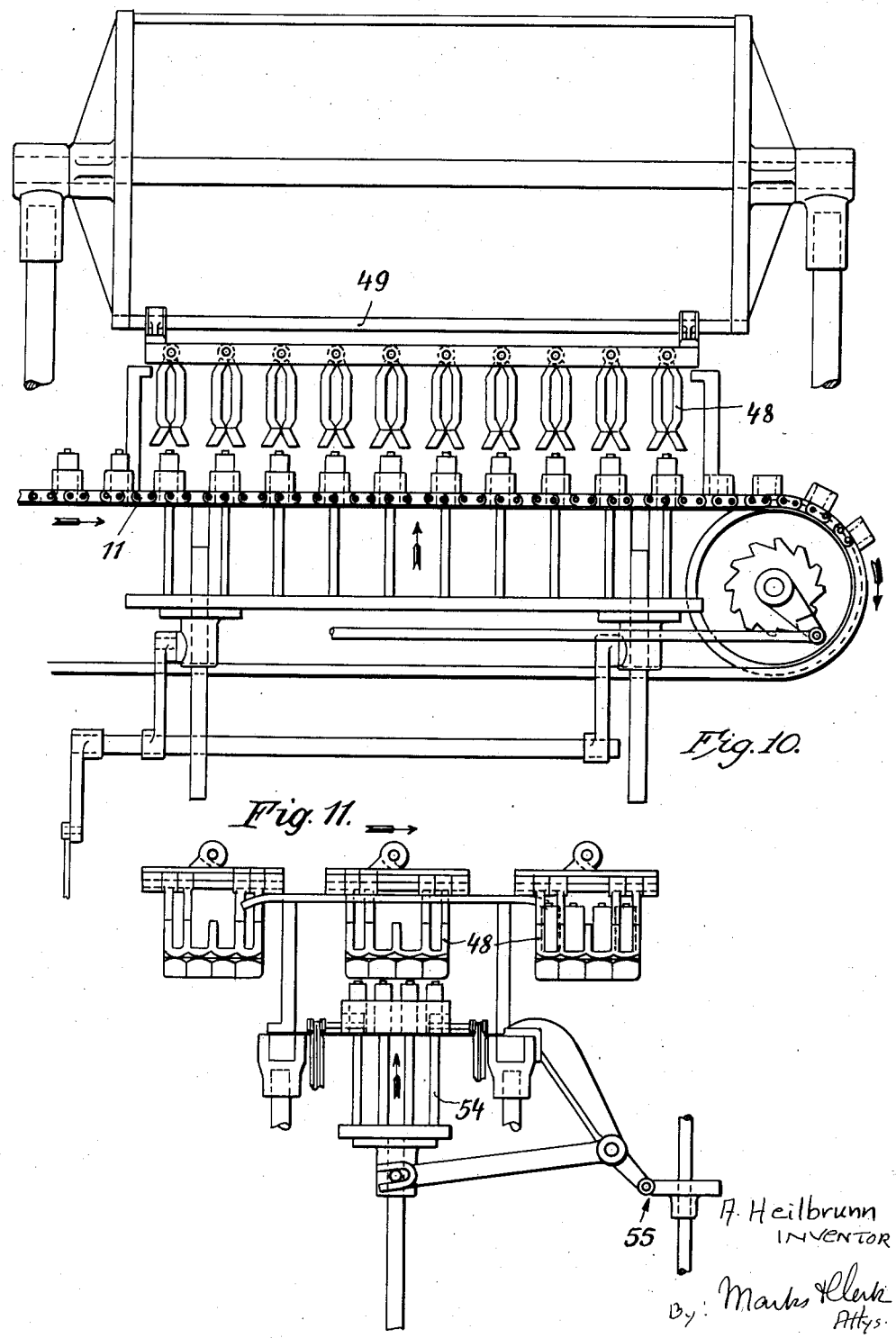

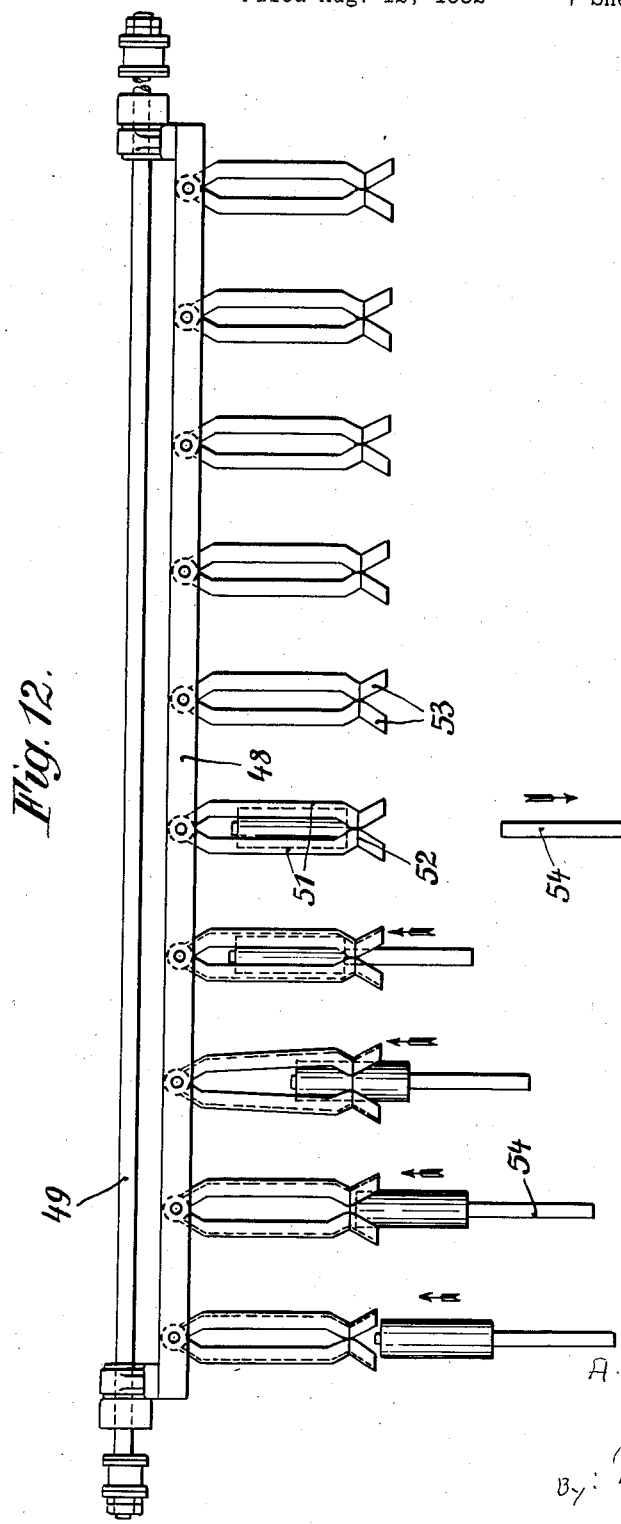

Patented Dec. 18, 1934

1,984,926

UNITED STATES PATENT OFFICE 1,984,926

MANUFACTURE OF GALVANIC CELLS

Alfred Heilbrunn, Hamburg, Germany, assignor to the firm L. Anker Maschinenfabrik, Hamburg, Germany Application August 12, 1932, Serial No. 628,593
In Germany July 2, 1931

6 Claims. (Cl. 226—1)

This invention relates to the mass production of galvanic dry cells, more particularly for batteries.

In assembling the cells from constituents which are supplied in a finished state or as raw material, and in the subsequent cooking, it has hitherto been necessary to employ a rather large number of workmen, who have to carry out by hand the individual operations, namely the supplying of containers, which may require to be previously tested, the filling of the containers with electrolyte, the insertion of the carbon dollies, with insulation, and the introduction of the container thus equipped into a cooking device.

As contrasted with this the present invention is essentially distinguished by the fact that these operations are carried out continuously in a completely automatic manner, the devices for the individual stages, particularly the electrolyte filling device, the device for inserting the dollies with insulation, and the cooking device, each being operative automatically, and the carriage of the components between the individual stages being effected by running bands. As an initial stage a container testing device may be provided.

In this manner the invention permits of economical mass production with a minimum expenditure of manual labour.

The invention is illustrated by way of example in the accompanying drawings, in which Figure 1 is a diagrammatic view of the plant as a whole, Figure 2 is a side view of the container testing device, with a device for placing the tested containers upon a first running band, this view being partly in section, Figure 3 is a front view of the device shown in Fig. 2, Figures 4 and 5 are longitudinal and transverse sections respectively through the electrolyte filling device.

Figure 7:
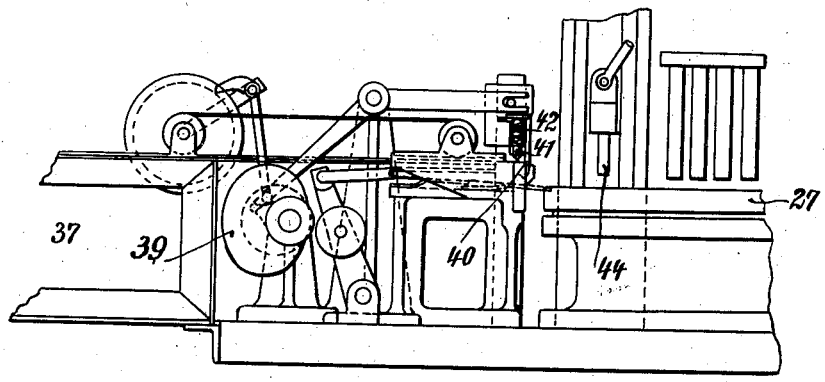
Figure 6:
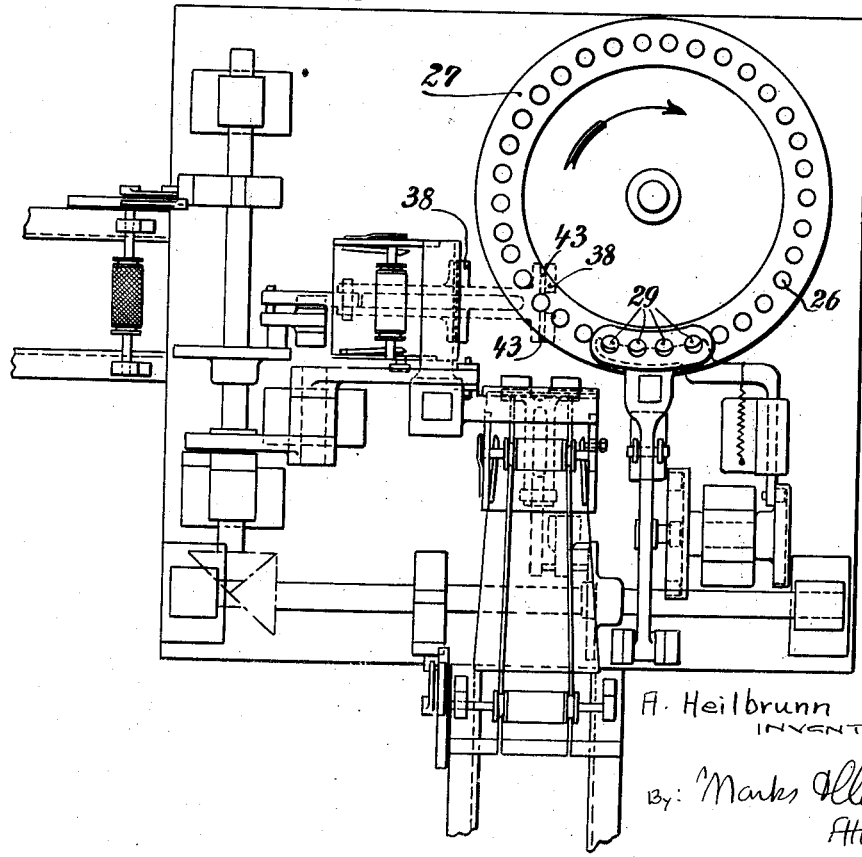
Figure 8:
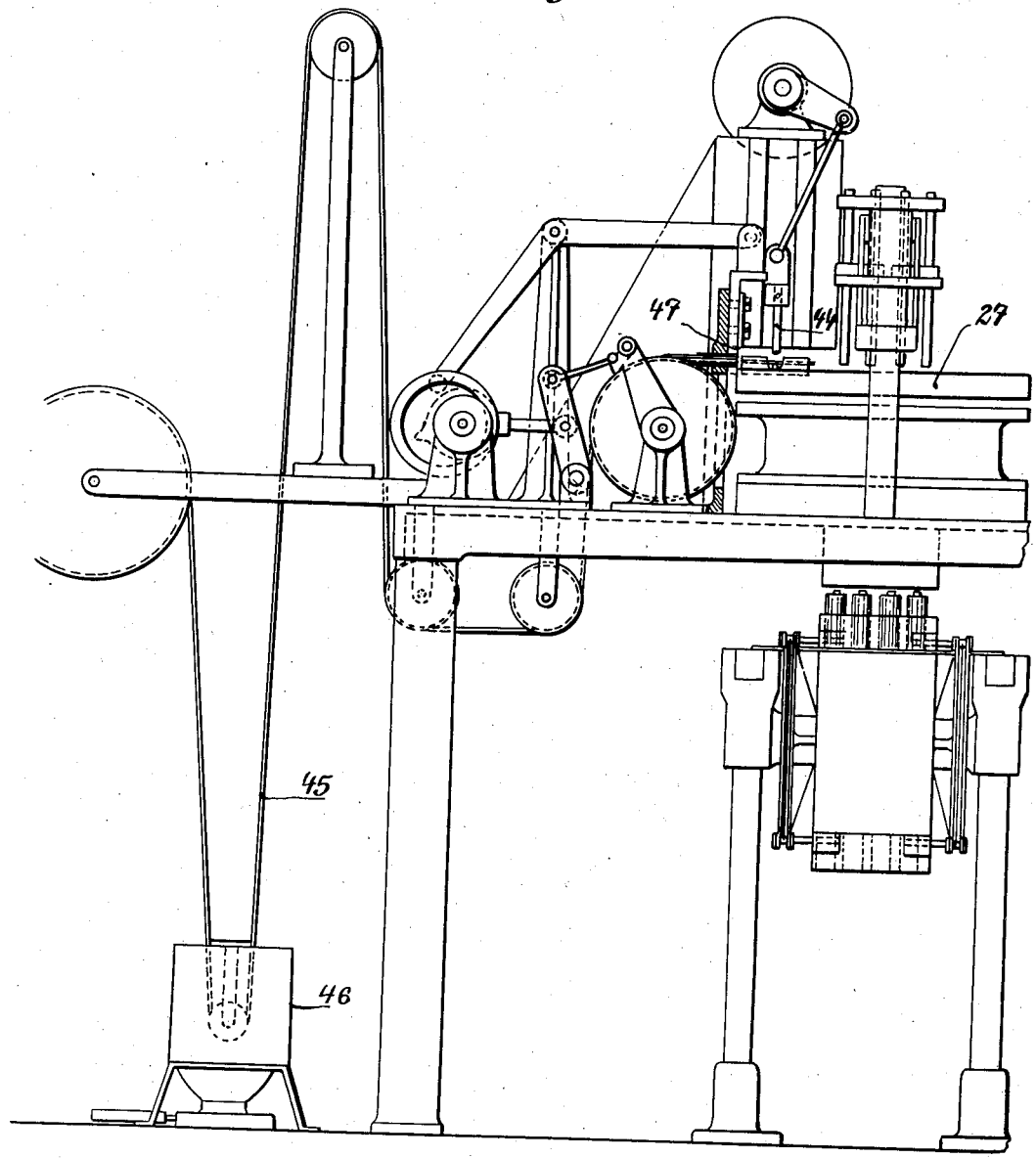
Figure 9:
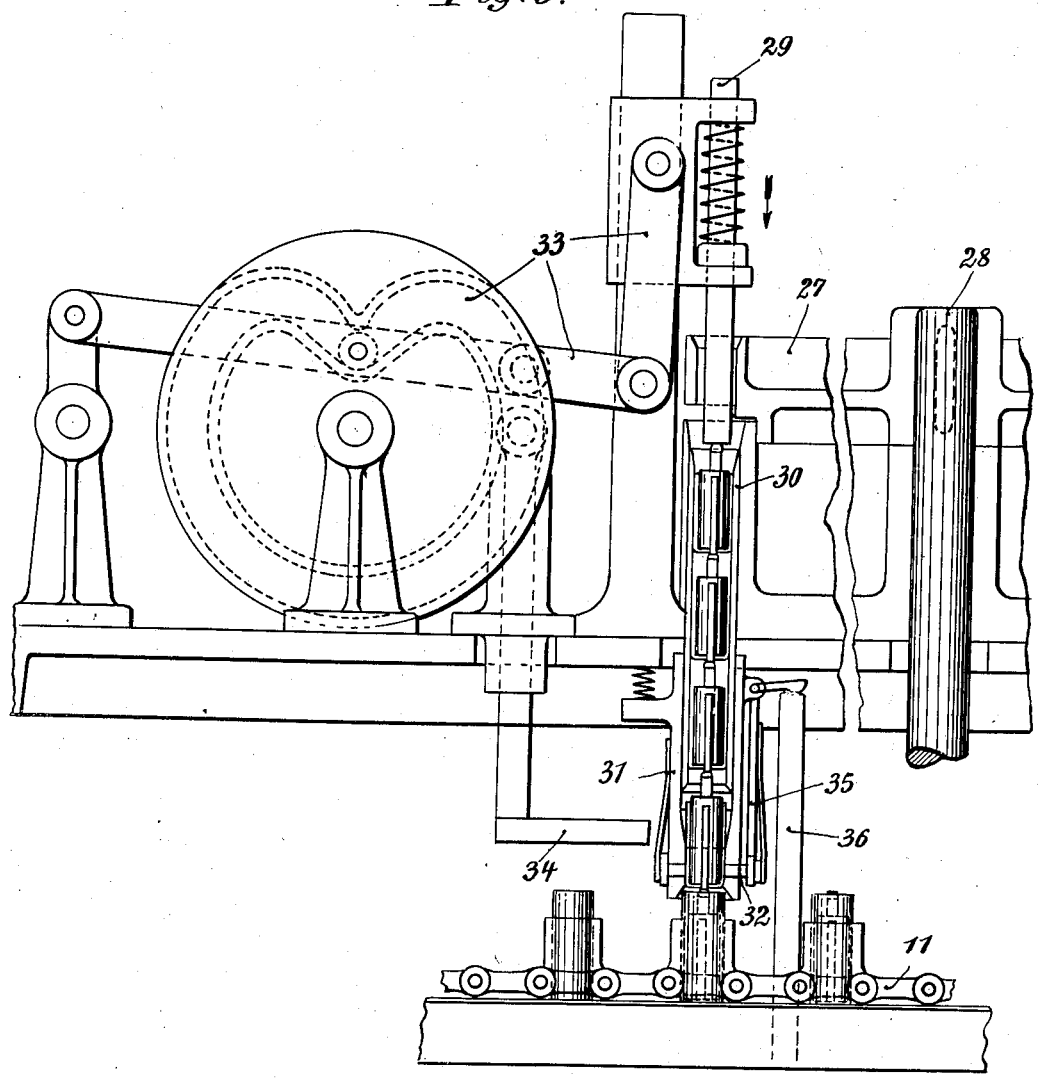
Figure 13:
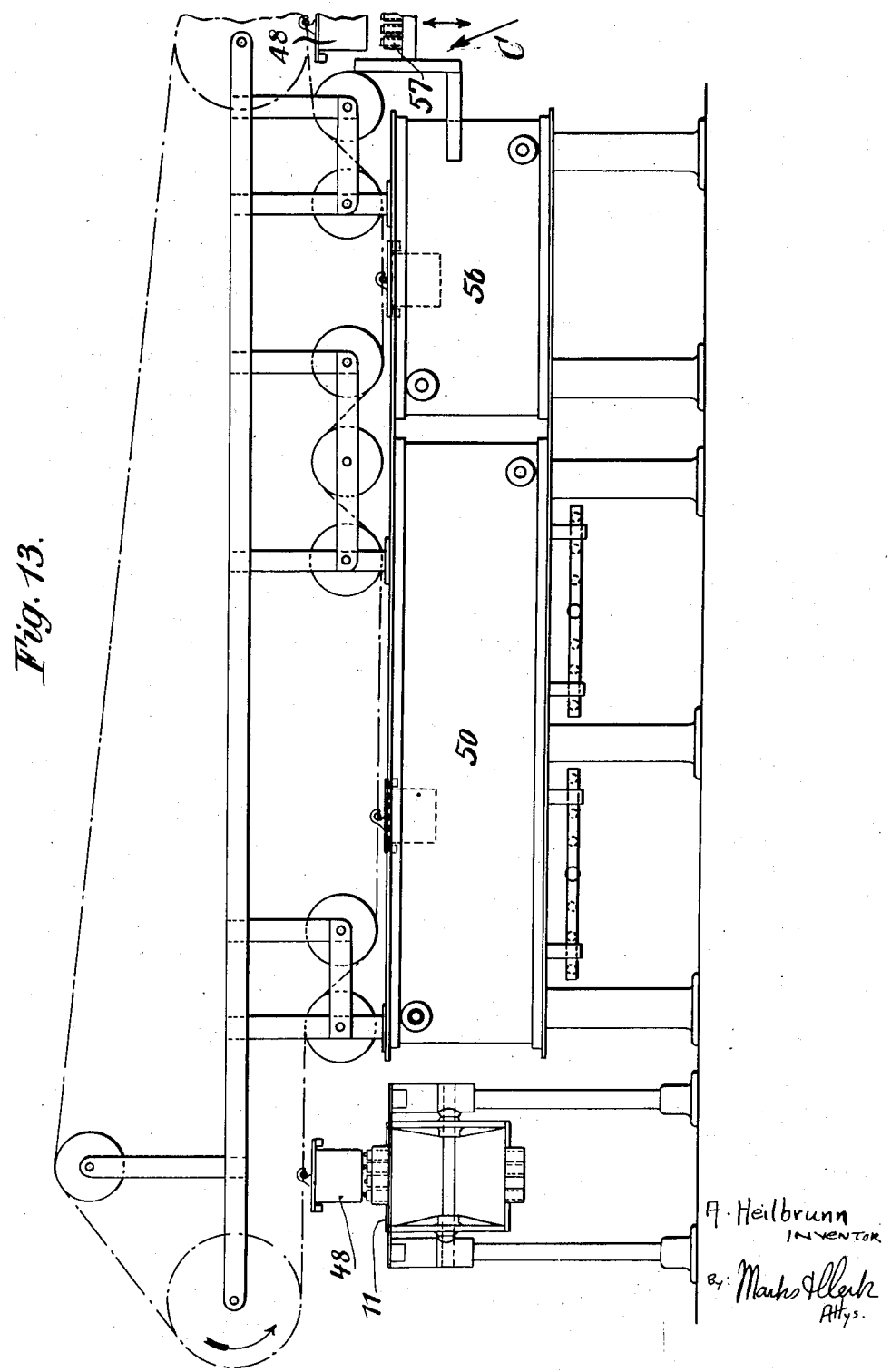

Figure 6 is a plan of the apparatus for delivering and cutting up strip-shaped pieces of dolly insulation, Figure 7 is a side view of the apparatus shown in Fig. 6, Figure 8 is a view similar to Fig. 7 of a modified form of construction for working up filamentary pieces of insulation, Figure 9 is a section through the device for inserting the dollies, together with their insulation in the containers, Figures 10 and 11 are a side view and a front view respectively of the device for taking over the containers from the first running band and passing them on into the cooking bath, Figure 12 shows a detail of the apparatus shown in Fig. 10 on a larger scale, and Figure 13 is a view of the cooking and cooling trough, together with adjacent parts.

The finished zinc containers supplied are first placed intermittently in a testing device, at the position marked A in Figure 1, where the first operator stands, who has to examine the containers and take out the unserviceable ones. The apparatus for this purpose, which is illustrated in Figures 1, 2 and 3, consists of an inclined revolving drum 2, open at the top in front, and provided with a glass bottom 1 illuminated from below, the wall 3 of which is formed with gaps 4 for the passage of those containers which, upon inspection, are found to be good, and therefore do not have to be taken out first. In the lower region the gaps are covered by a tongue 5, which does not revolve with the drum and which separates the gaps from the interior of the drum, so that the containers are here prevented from passing through the drum wall.

The containers that pass through are carried along by the drum wall 3 until they arrive over holes 6 in a stationary drum support 7, into which they fall. Underneath the holes there is a movable slide 8, which is periodically opened and closed by the machine drive. When it is opened, four containers fall into the four grooves 9. The slide is so constructed that upon being closed it acts at the same time as a ram for the containers that have dropped into the channels, for the purpose of now pushing them into a holding device 10 on a first running band or belt conveyor 11. Each holding device is designed for a group of as many containers as there are channels 9, that is to say, four in the example illustrated.

The containers are now arranged in groups upon the running band 11 and are carried by it to the electrolyte filling device 12. This filling device, which is located at the position marked 12 in Fig. 1, and which is illustrated in Figures 4 and 5, is so constructed that it first measures in advance the quantity of electrolyte required for each container in a first group of measuring chambers 13, then regulates it exactly in a second group of measuring chambers 14, and finally fills it into the containers, all this being done automatically.

This apparatus consists of a slide 15, containing the preparatory measuring chambers 13 and reciprocated from the machine drive. This slide is located between an upper plate 16 with bores 17 for the admission, and a lower plate 18 with passages 19, which lead to the measuring chambers 14 for the final measuring of the electrolyte. The upper slide plate 16 is resiliently arranged in relation to the lower one, so that no appreciable heat is produced by friction which might bring about premature thickening of the electrolyte.

The preliminary measuring chambers in the slide take up, as soon as the upper apertures 20 therein, by the movement of the slide, register with the outlet apertures 17 in the upper slide plate, a quantity of electrolyte, which can be regulated by a screw 21 passing through the chamber wall. During the further movement of the slide, lower apertures 22 in the preliminary measuring chambers come into register with the passages 19 in the lower slide plate, so that the electrolyte now flows down into the measuring chambers 14 of the second group. The chambers 14 are closed below by valves 23 controlled from the machine drive. The exact regulating of the quantity of liquid passing into the chambers 14 is effected in each case by a regulating nut 24, which forms the upper margin of the gapped chamber, and by the height of which the volume of the chamber is determined. Excess electrolyte flows into a trough 25, from which it can be recovered.

The valves 23 move with such periodicity that they open when the containers mounted upon the running band are located just below them. The containers are in this way filled with a very accurately regulated quantity of liquid.

The running band 11 now brings the containers to the working position B, shown in Figure 1. At this position are located the automatic devices illustrated in Figures 6 to 9 for inserting the carbon dollies and the insulation which insulates the dollies from the containers. One person has to insert the dollies delivered at this point, which have previously been acidified, into holes 26 in a horizontal applying wheel 27. Everything else is done automatically.

The applying wheel arranged above the running band 11 is rotated stepwise about a vertical shaft 28 by a ratchet and pawl gear. As soon as four holes in the wheel, filled with dollies, have arrived exactly above the four corresponding containers, which have been brought upon the running band, four rams 29 controlled by a cam, press the dollies down through passages 30 until they reach sleeves 31, in which they are prevented from dropping further downwards by a movable locking pin 32. The descent of a holder 34 connected with the ram drive 33 has the result that the longitudinally displaceable sleeves 31 also sink down to the containers located below. At the end of this movement the locking pin, which is mounted on a bent lever 35 pivoted to the sleeve, by virtue of the other arm of the bent lever striking against a stop 36, is pulled away from the dollies, which now drop into the containers.

On their way downwards through the holes in the applying wheel the lower ends of the dollies find an automatically formed insulating skeleton, the centre point of which is approximately in the axis of the dolly, and which is therefore taken downwards with it into the correct position between the zinc container and the carbon dolly. For the preparatory positioning of the insulating skeleton there serve devices by which it is automatically formed in the shape of a cross or star and placed in the holes of the applying wheel. Crosses of presspahn, cardboard or prepared woolen threads may for example be employed. Advantageous devices for forming and supplying the cross are shown in Figures 6, 7 and 8.

If presspahn is employed, as is assumed in Figs. 6 and 7, two strip magazines 37 are provided, out of each of which a strip of presspahn of a breadth corresponding to the size of the insulating cross is led to the applying wheel, one strip in the longitudinal direction of the machine for instance, and the second at right angles thereto.

By an intermittently acting drive 39, each of the strips is pushed so far forward that a piece corresponding to the breadth of the arm of the insulating cross projects beyond the edges of a cutting support 40. In this position the strip is held fast by resilient pointed tips 41, which descend with the cutting knife 42, and grip the strip during the cutting. The cross strip cut off falls into the receiving groove 43 of a reciprocating slide 38. As soon as the two arms of a cross in the two superposed slides have arrived above a hole 26 in the applying wheel, the ram 44 descends and pushes the two bars, superposed crosswise in the grooves, through apertures in the slides into the hole in the applying wheel. The ends of the intersecting bars then rise up, so that an insulating skeleton of the desired form is produced. During the further rotation of the applying wheel, the holes in the applying wheel provided with the insulating piece have dollies inserted into them by hand, and now pass into the path of the four rams 29, which, in the manner already described, lower the dollies, together with the insulation, into the containers upon the running band.

If woolen threads are employed, as is assumed in Fig. 8, two supply threads 45 are provided, which again intersect one another at right angles, and, after running through a bath 46, which may contain liquid paraffin of high melting point for example, are severed by cutting appliances 47, and carried into the holes in the applying wheel like the presspahn bars.

The further procedure also agrees with that adopted when using presspahn.

The containers now travel to the cooking position.

For the cooking there is usually used a cooking bath into which the containers are plunged. The containers may however alternately pass through a heated cooking chamber of sufficiently high temperature. When a cooking bath is employed it is necessary to dip the containers into the bath from above. For this purpose are provided, according to Figures 10 to 13, beyond the working position B, above the running band, suspension grippers 48, which take over the containers arriving in groups of four upon the first running band 11 and convey them into the cooking bath. In the constructional example the grippers are designed for four containers each, to correspond to the number of containers in each group. They are suspended in their turn from a second running band 49, which, for the purpose of saving space, may be arranged at right angles to the first running band 11. The same remark applies to the cooking trough 50. Each gripper consists of tongs 51 pivoted to the running band 49, the jaws of these tongs being equipped with four recesses, corresponding to the number of containers to be held, these recesses supplementing one another in pairs to form cylinders. The two jaws are urged towards one another by a spring 52. At the lower end they form conical mouths 53, which open under the pressure of the containers pushed into them.

In the constructional example illustrated, ten such quadruple pairs of tongues are provided, giving a capacity of forty containers.

What I claim is:

1. In a machine for continuous filling and cooking galvanic cells having a mechanical conveyor for the containers through automatic devices for filling said containers with electrolyte, and for inserting the dollies together with insulation and for cooking and cooling; a horizontal stepwise operated applying wheel provided with a ring having vertical bores, means for inserting in said bores an insulating skeleton at a predetermined point of the angle of rotation and carbon dollies at a second point and means at a third point of the angle of rotation for delivering the carbon dollies together with the insulation downwardly, said delivery means consisting of synchronously moving rams, sleeves adapted to move up and down synchronously with the movement of said rams and forming of chute passages, said sleeves having a transversely displaceable checking pin, an abutting bell-crank lever for retracting said pin during the descent of the sleeve, permitting the carbon dolly which has slipped into the sleeve to drop out into containers placed underneath.

2. Machine according to claim 1, in which the sleeve has a free run in relation to the descending ram.

3. Machine according to claim 1 provided with two feeding strips of insulating material disposed at an angle to one another, a cutting appliance on each of said strips adapted to cut off pieces from the fed strips for forming the insulating skeleton, and controlled slides adapted to convey the cut off pieces over the applying wheel, a mechanically controlled ram adapted to force the formed insulating cross downwardly through recesses into one of the bores of the applying wheel ready to receive a dolly.

4. Machine according to claim 1 provided with two feeding strips of insulating material disposed at an angle to one another, a cutting appliance on each of said strips adapted to cut off pieces from the fed strips for forming the insulating skeleton, and controlled slides adapted to convey the cut off pieces over the applying wheel, a mechanically controlled ram adapted to force the formed insulating cross downwardly through recesses into one of the bores of the applying wheel ready to receive a dolly, a resilient clamp adapted to move up and down with the knife of each cutting appliance and grip the strip to be cut just before the cutting takes place.

5. Machine according to claim 1 provided with two feeding strips of insulating material disposed at an angle to one another, a cutting appliance on each of said strips adapted to cut off pieces from the fed strips for forming the insulating skeleton, and controlled slides adapted to convey the cut off pieces over the applying wheel, a mechanically controlled ram adapted to force the formed insulating cross downwardly through recesses into one of the bores of the applying wheel ready to receive a dolly, a cooking trough conveyor mounted above the main conveyor carrying suspension grippers for the reception of the cells, synchronously moving rams adapted to force a plurality of containers directly into the suspension grippers, said rams being situated underneath the belt conveyor, said grippers being provided in their lower part with resilient, inclined jaws which are adapted to open under the pressure of the containers and close again underneath the containers.

6. Machine according to claim 1 provided with two feeding strips of insulating material disposed at an angle to one another, a cutting appliance on each of said strips adapted to cut off pieces from the fed strips for forming the insulating skeleton, and controlled slides adapted to convey the cut off pieces over the applying wheel, a mechanically controlled ram adapted to force the formed insulating cross downwardly through recesses into one of the bores of the applying wheel ready to receive a dolly, a cooking trough conveyor mounted above the main conveyor carrying suspension grippers for the reception of the cells, synchronously moving rams adapted to force a plurality of containers directly into the suspension grippers, said rams being situated underneath the belt conveyor, said grippers being provided in their lower part with resilient, inclined jaws which are adapted to open under the pressure of the containers and close again underneath the containers, tubes adapted to force apart said suspension grippers, said tubes being situated behind the cooling trough at a further operating point so as to allow the completed cells to drop out of the plant.

ALFRED HEILBRUNN.